Apr. 10, 1923.
W. MAXWELL
1,451,046
SCENIC EFFECT
Filed Aug. 22, 1921
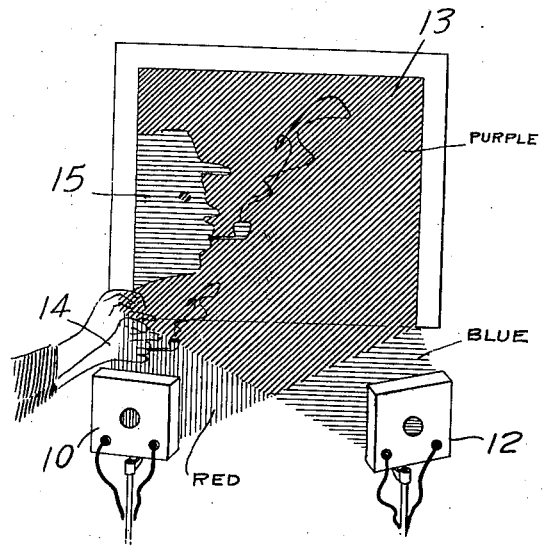
Inventor
William Maxwell
By L. L. Morrill
Attorney Patented Apr. 10, 1923.

1,451,046

UNITED STATES PATENT OFFICE.

WILLIAM MAXWELL, OF REVERE, MASSACHUSETTS.

SCENIC EFFECT.

Application filed August 22, 1921. Serial No. 494,241.

*To all whom it may concern:*

Be it known that I, WILLIAM MAXWELL, a citizen of the United States, residing at Revere, in the county of Suffolk and State of Massachusetts, have invented certain new and useful Improvements in Scenic Effects, of which the following is a specification.

This invention relates to scenic effects and has for an object to provide means for producing shadowgraphs on a screen which shall be variously colored as distinguished from black or white as is the case in ordinary shadow pictures.

A further object of the invention is to throw upon a screen differently colored lights commingling to form upon the screen a still different colored light and to interpose in the rays of one or both of said lights some object which shall cut off the particular rays of light from some section of the screen, such section remaining illuminated by the other colored light only.

It is well known that if lights of different colors are thrown upon a screen to cover the same surface the lights will combine to form such a color as results from the combination of the primary colors projected. For instance, if a red light and a blue light are projected upon the same screen to cover the entire or the same surface, the resultant illumination upon the screen will be purple. If a yellow light and a blue light are thrown upon the screen, the resultant illumination will be green.

The present invention takes advantage of this well known law and provides for throwing upon the screen in such manner two lights of different colors and then interposing in the rays of one of said illuminating elements some object which shall cut off from a section of the screen the projected rays, leaving only the illumination of the other element at such particular portion of the screen.

The drawing illustrates conventionally the carrying out of the present invention.

For instance, there is shown at 10 an illuminating element projected upon the screen 11 rays which have been shaded to represent red, while the illuminating element 12 projects upon the same screen to cover the same surface rays which are shaded to represent blue. The illumination as indicated at 13 upon the screen is shaded to indicate purple which would result from the commingling of red and blue rays.

In the operation of the effect some object, as for instance the hands 14 of the operator, are introduced into the projected rays of one of the elements, as for instance into the projected red rays from the element 10, cutting off from the screen 13 the red rays whereby there appears upon the screen at 15 a configuration illuminated only by blue from the element 12. In this manner there can be made to appear upon the purple screen moving or other objects illuminated by blue rays and, of course, it is obvious introducing a similar or other object into the blue rays will cut off such blue rays and project upon another portion of the screen a red image whereby there can be made to appear upon the purple screen both red and blue images as may be found desirable in carrying forward the present invention.

It will be understood, of course, that red and blue have been illustrated solely for the purpose of conventionally showing the manner of carrying out the invention.

It is well known that, if yellow and white rays are projected upon the screen at the same time to cover the same surface, the entire surface will appear white, as the yellow rays, for instance, are absorbed or overcome by the intensity of the white rays, but, if by the intensity of the white rays are interrupted, the image will appear in yellow upon a white screen so that the present invention is not limited to the actual projection of a plurality of lights upon the screen of different colors, but as noted may include a single color and a projection of a white light.

It will also be obvious that the present invention is capable of a great number of variations within the scope of projecting a plurality of lights upon a screen and then cutting off from the screen the rays of one of the lights from only a portion of the screen. It is also obvious that while only two lights have been shown and described a greater number may likewise be employed with added effects as to variations of colors.

It is also to be understood that the drawing which has been described above is not in any way intended as indicating an apparatus for carrying out the process but only to illustrate the invention, which consists in projecting the rays of lights upon a screen and cutting off some of said rays for the purpose of producing upon the screen differently colored representations.

What I claim is:

1. The method of producing scenic effects consisting in commingling upon the same screen area differently colored lights from a plurality of illuminating elements and producing a figure on said illuminated area by interposing in the rays from one of said elements an opaque body having outlines corresponding in miniature to the figure.

2. The method of producing scenic effects consisting in commingling upon the same screen area differently colored lights from a plurality of illuminating elements to produce a resultant illumination different from either and producing a figure on said illuminated area by introducing in the rays from one of said elements an opaque body having outlines corresponding in miniature to the figure, said figure appearing in the color projected from the other element.

In testimony whereof I affix my signature.

WILLIAM MAXWELL.